(12) United States Patent
Davenport et al.

(10) Patent No.: US 11,755,470 B2
(45) Date of Patent: Sep. 12, 2023

(54) SYSTEM AND METHOD FOR REDUCED LOCK CONTENTION AND IMPROVED PERFORMANCE

(71) Applicant: EMC IP Holding Company, LLC, Hopkinton, MA (US)

(72) Inventors: William C. Davenport, San Diego, CA (US); Dixitkumar Vishnubhai Patel, Monroe, NJ (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 986 days.

(21) Appl. No.: 16/525,337

(22) Filed: Jul. 29, 2019

(65) Prior Publication Data

US 2021/0034510 A1 Feb. 4, 2021

(51) Int. Cl.
*G06F 9/50* (2006.01)
*G06F 12/02* (2006.01)
*G06F 12/1009* (2016.01)

(52) U.S. Cl.
CPC ........ *G06F 12/0238* (2013.01); *G06F 9/5016* (2013.01); *G06F 12/1009* (2013.01)

(58) Field of Classification Search
CPC . G06F 12/0238; G06F 9/5016; G06F 12/1009
See application file for complete search history.

(56) References Cited

U.S. PATENT DOCUMENTS

| | | | |
|---|---|---|---|
| 7,197,620 B1* | 3/2007 | Adcock | G06F 12/1018 711/202 |
| 9,015,426 B2* | 4/2015 | Stabrawa | G06F 3/0659 711/154 |
| 2013/0332588 A1* | 12/2013 | Maytal | H04L 41/18 709/223 |
| 2018/0101480 A1* | 4/2018 | Abhishek Raja | G06F 12/1027 |
| 2018/0267892 A1* | 9/2018 | Harrison, III | G06F 12/023 |
| 2019/0065226 A1* | 2/2019 | Neiger | G06F 9/45558 |

* cited by examiner

*Primary Examiner* — Emerson C Puente
*Assistant Examiner* — Jonathan R Labud
(74) *Attorney, Agent, or Firm* — Brian J. Colandreo; Heath M. Sargeant; Holland & Knight LLP

(57) ABSTRACT

A method, computer program product, and computer system for setting a preferred alignment value to a size of an address space mapped by one or more root pages. An allocation request may be received for the address space. A binary buddy allocation scheme may be executed to allocate an extent for the allocation request based upon, at least in part, the preferred alignment value.

15 Claims, 5 Drawing Sheets

SYSTEM AND METHOD FOR REDUCED LOCK CONTENTION AND IMPROVED PERFORMANCE

BACKGROUND

Some storage systems may have a hierarchical log structured implementations (e.g., a mapper layer) where there may be 4 levels of indirect blocks used to access data for volumes (e.g., Root-node, Top-node, Mid-node, Leaf-node). A leaf-node generally covers 2 MB of address space, a mid-node generally covers 1 GB of address space, a top-node generally covers 512 GB of address space, and a root-node generally covers 256 TB of address space. With standard binary buddy allocation methods, many volumes created in the storage system may share the same root indirect block page (or even share the same top (or lower) pages, depending on granularity of allocation). Some systems may allocate an entire top per object but this should not be considered a limitation to having only the root pages being the possible performance bottleneck). Since this page is accessed in all data operations, the single root page shared by many volumes may become a performance issue.

BRIEF SUMMARY OF DISCLOSURE

In one example implementation, a method, performed by one or more computing devices, may include but is not limited to setting a preferred alignment value to a size of an address space mapped by one or more root pages. An allocation request may be received for the address space. A binary buddy allocation scheme may be executed to allocate an extent for the allocation request based upon, at least in part, the preferred alignment value.

One or more of the following example features may be included. Each volume may be distributed to a different root indirect block page of the one or more root pages based upon, at least in part, the preferred alignment value being set to the size of the address space mapped by the one or more root pages. A remainder of the address space associated with the extent may be freed. Executing the binary buddy allocation scheme may include searching allocatable blocks in the address space to determine if the extent matches the preferred alignment value. The extent may be iteratively split into smaller blocks when the extent matches the preferred alignment value or a larger extent with a larger alignment value may be iteratively split into smaller blocks when the extent does not match the preferred alignment value. A next smaller power of the preferred alignment value may be utilized when the extent does not match the preferred alignment value. Additional volumes created in the address space may be spread uniformly through the one or more root pages.

In another example implementation, a computing system may include one or more processors and one or more memories configured to perform operations that may include but are not limited to setting a preferred alignment value to a size of an address space mapped by one or more root pages. An allocation request may be received for the address space. A binary buddy allocation scheme may be executed to allocate an extent for the allocation request based upon, at least in part, the preferred alignment value.

One or more of the following example features may be included. Each volume may be distributed to a different root indirect block page of the one or more root pages based upon, at least in part, the preferred alignment value being set to the size of the address space mapped by the one or more root pages. A remainder of the address space associated with the extent may be freed. Executing the binary buddy allocation scheme may include searching allocatable blocks in the address space to determine if the extent matches the preferred alignment value. The extent may be iteratively split into smaller blocks when the extent matches the preferred alignment value or a larger extent with a larger alignment value may be iteratively split into smaller blocks when the extent does not match the preferred alignment value. A next smaller power of the preferred alignment value may be utilized when the extent does not match the preferred alignment value. Additional volumes created in the address space may be spread uniformly through the one or more root pages.

In another example implementation, a computer program product may reside on a computer readable storage medium having a plurality of instructions stored thereon which, when executed across one or more processors, may cause at least a portion of the one or more processors to perform operations that may include but are not limited to setting a preferred alignment value to a size of an address space mapped by one or more root pages. An allocation request may be received for the address space. A binary buddy allocation scheme may be executed to allocate an extent for the allocation request based upon, at least in part, the preferred alignment value.

One or more of the following example features may be included. Each volume may be distributed to a different root indirect block page of the one or more root pages based upon, at least in part, the preferred alignment value being set to the size of the address space mapped by the one or more root pages. A remainder of the address space associated with the extent may be freed. Executing the binary buddy allocation scheme may include searching allocatable blocks in the address space to determine if the extent matches the preferred alignment value. The extent may be iteratively split into smaller blocks when the extent matches the preferred alignment value or a larger extent with a larger alignment value may be iteratively split into smaller blocks when the extent does not match the preferred alignment value. A next smaller power of the preferred alignment value may be utilized when the extent does not match the preferred alignment value. Additional volumes created in the address space may be spread uniformly through the one or more root pages.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
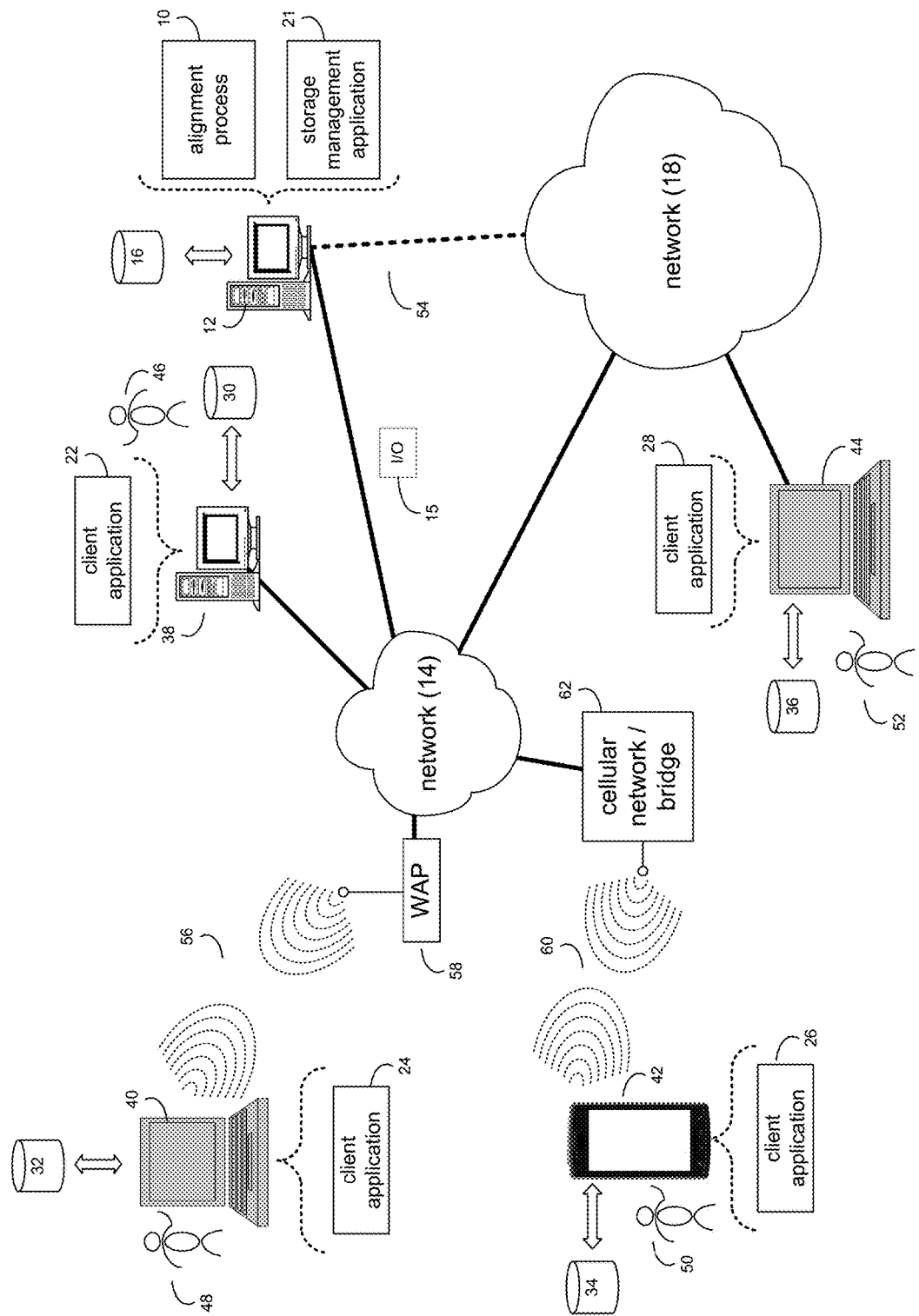
FIG. 1 is an example diagrammatic view of an allocation process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown allocation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a allocation process, such as allocation process 10 of FIG. 1, may set a preferred alignment value to a size of an address space mapped by one or more root pages. An allocation request may be received for the address space. A binary buddy allocation scheme may be executed to allocate an extent for the allocation request based upon, at least in part, the preferred alignment value.

In some implementations, the instruction sets and subroutines of allocation process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, allocation process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, allocation process 10 and/or storage management application 21 may be accessed via one or more of client applications 22, 24, 26, 28. In some implementations, allocation process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within allocation process 10, a component of allocation process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of allocation process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of allocation process 10 (and vice versa). Accordingly, in some implementations, allocation process 10 may be a purely server-side application, a purely client-side application, or a hybrid server-side/client-side application that is cooperatively executed by one or more of client applications 22, 24, 26, 28 and/or allocation process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, allocation process 10, and storage management application 21, taken singly or in any combination, may effectuate some or all of the same functionality, any description of effectuating such functionality via one or more of client applications 22, 24, 26, 28, allocation process 10, storage management application 21, or combination thereof, and any described interaction(s) between one or more of client applications 22, 24, 26, 28, allocation process 10, storage management application 21, or combination thereof to effectuate such functionality, should be taken as an example only and not to limit the scope of the disclosure.

In some implementations, one or more of users 46, 48, 50, 52 may access computer 12 and allocation process 10 (e.g., using one or more of client electronic devices 38, 40, 42, 44) directly through network 14 or through secondary network 18. Further, computer 12 may be connected to network 14 through secondary network 18, as illustrated with phantom link line 54. Allocation process 10 may include one or more user interfaces, such as browsers and textual or graphical user interfaces, through which users 46, 48, 50, 52 may access allocation process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
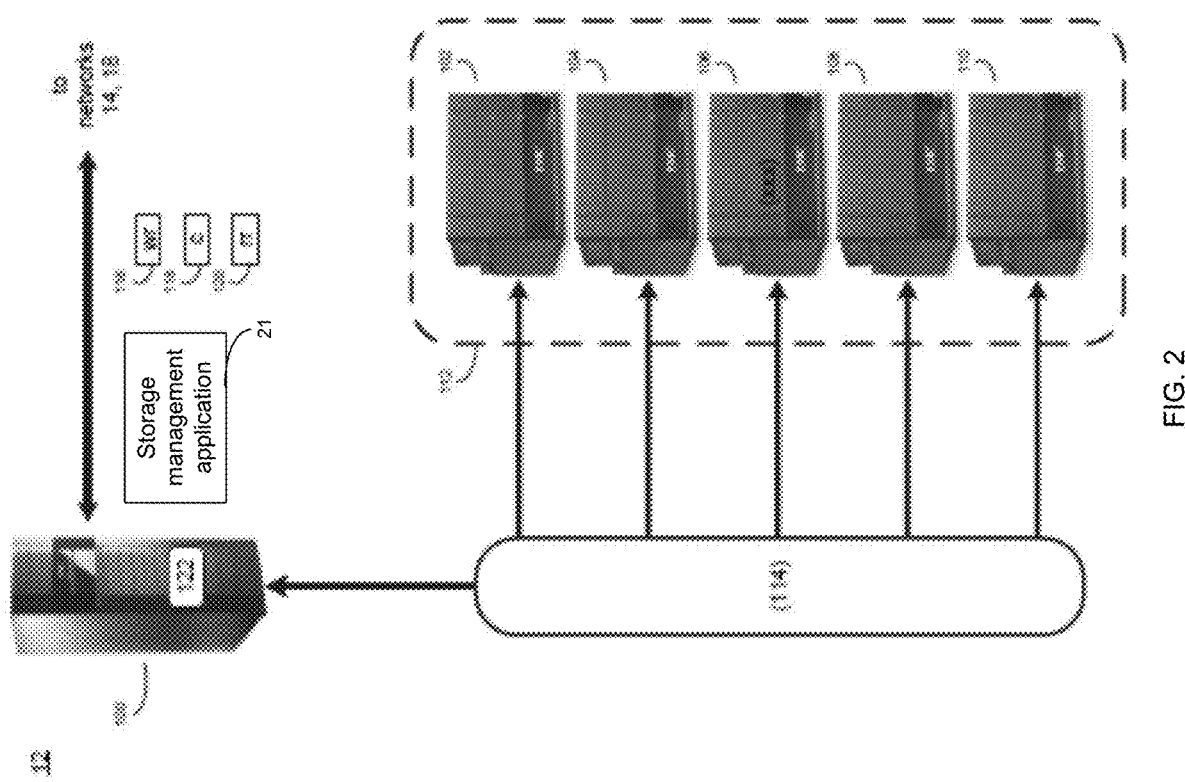
FIG. 2 is an example diagrammatic view of a storage system of FIG. 1 according to one or more example implementations of the disclosure.
Figure 3:
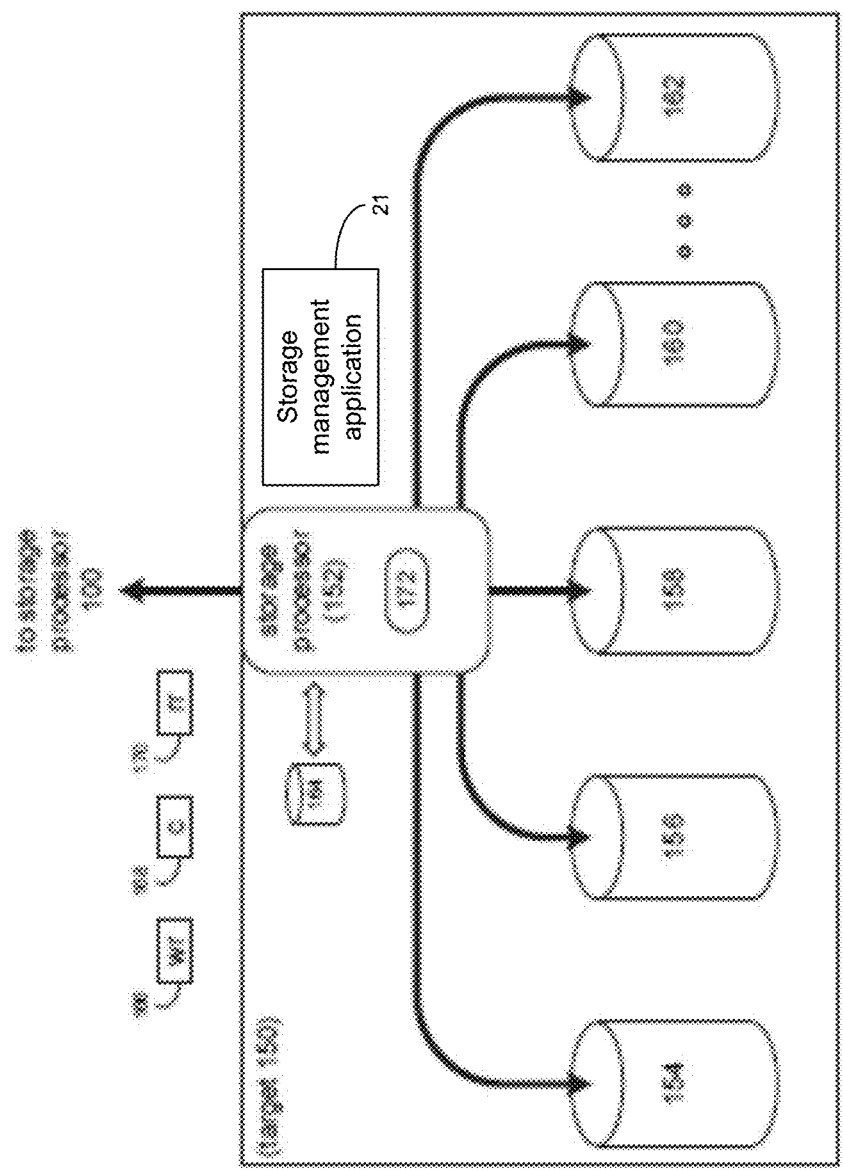
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or allocation process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Some storage systems may have a hierarchical log structured implementations. For instance, and referring at least to the example FIG. 4, an example logical diagrammatic view of a log structured storage system 400 is shown. It will be appreciated that a log structured storage system may not be required for the present disclosure. In the storage system, to support features such as thin-provisioning, snapshots and deduplication, logical address space out of which volumes are created may be mapped to log-structured address space using a tree like data-structure. For example, n-way (e.g., where n=512) tree with a depth of 4 (Root-node, Top-node, Mid-node, Leaf-node) may describe 2 MB of log-space at 4 block size. The 4-level indirection scheme to access user data may be as follows:

Root: This may be the root of the log structured hierarchy that may eventually point to multiple volumes.

Leaf: Logical Block Address (LBA) representation layer, generally organized as a tree. Each leaf entry generally corresponds to a specific LBA range.

Virtual Large Block (VLB): Isolates LBA layer from physical storage. Encapsulates physical location of the user data and allows data relocation without necessity to update Leafs.

Physical Large Block (PLB): In log structured systems, the data is stored in contiguous chunks of data, called PLB (e.g., 2 MB chunks). The actual user data pages reside inside, and they may be referenced by one or more VLBs.

As such, the structure may be generally described as: Root Top Mid/Leaf (LBA representation) Virtual Block (VLB) Physical Block (PLB). For example, after a write operation: Leaf, corresponding to LBA will point to VLB that contains references to PLBs where the user data is stored.

With standard binary buddy allocation methods, many volumes created in the storage system may share the same root indirect block page (or even share the same top (or lower) pages, depending on granularity of allocation). Some systems may allocate an entire top per object but this should not be considered a limitation to having only the root pages being the possible performance bottleneck). Since this page may be accessed in all data operations, the single root page shared by many volumes may become a performance issue. That issue may be predominately caused by cache level locks that guard access to the page. With many CPUs accessing the same page, the act of acquiring these locks may cause the cache line containing the lock to be bounced back and forth between processor caches. This may become an even larger issue when multiple sockets are involved. The additional latency caused by the cache lines moving between the CPUs may cause measureable performance degradation. A possible approach is to completely remove the root indirect pages, but this may come with a number of challenges and considerable risk. As such, as will be discussed below, the present disclosure may introduce the concept of preferred allocation alignment to the binary buddy allocation method for managing space in a storage system, thereby reducing lock contention and improving performance of the storage system.

Figure 4:
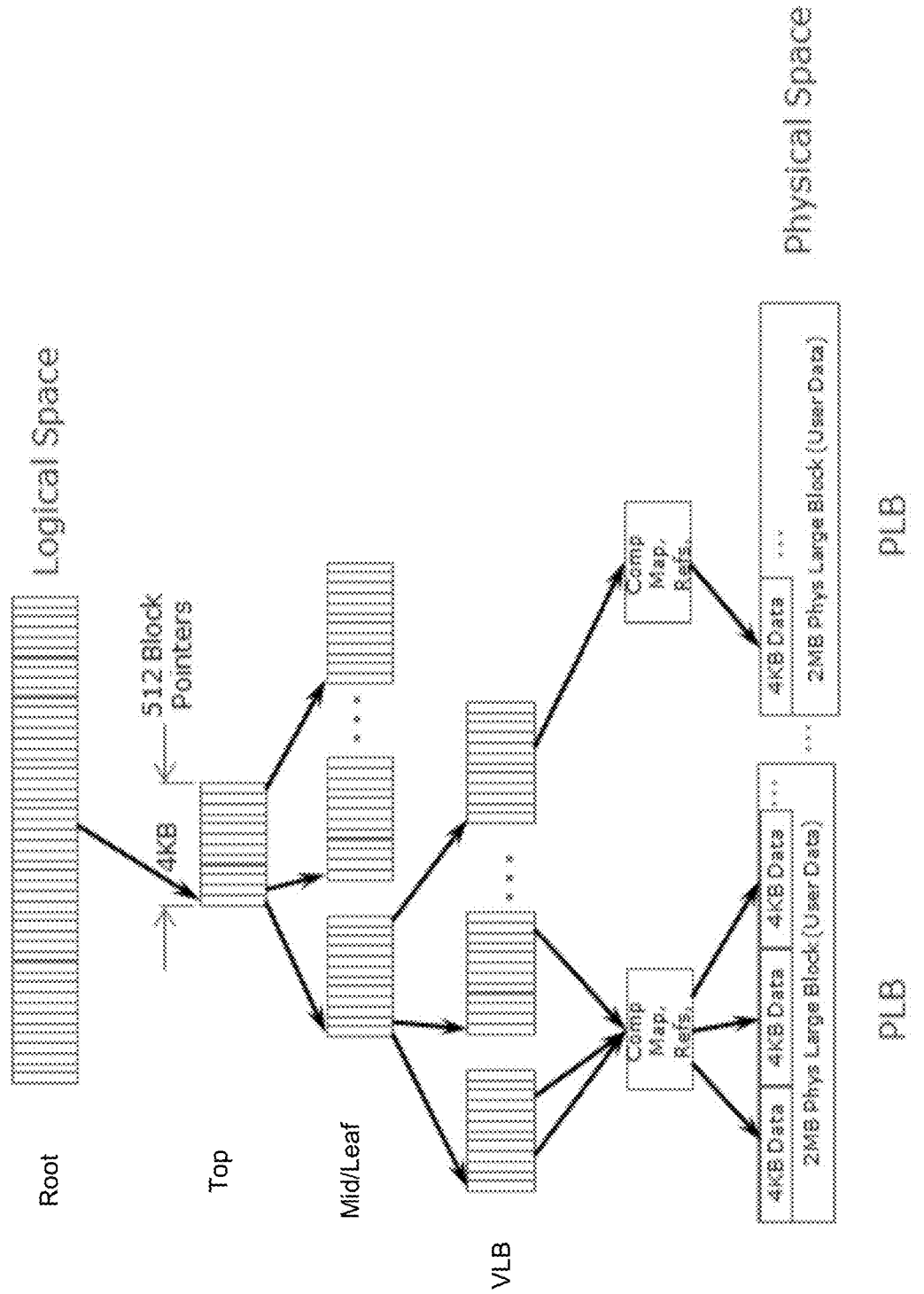
FIG. 4 is an example diagrammatic view of a log structured storage system according to one or more example implementations of the disclosure.
Figure 5:
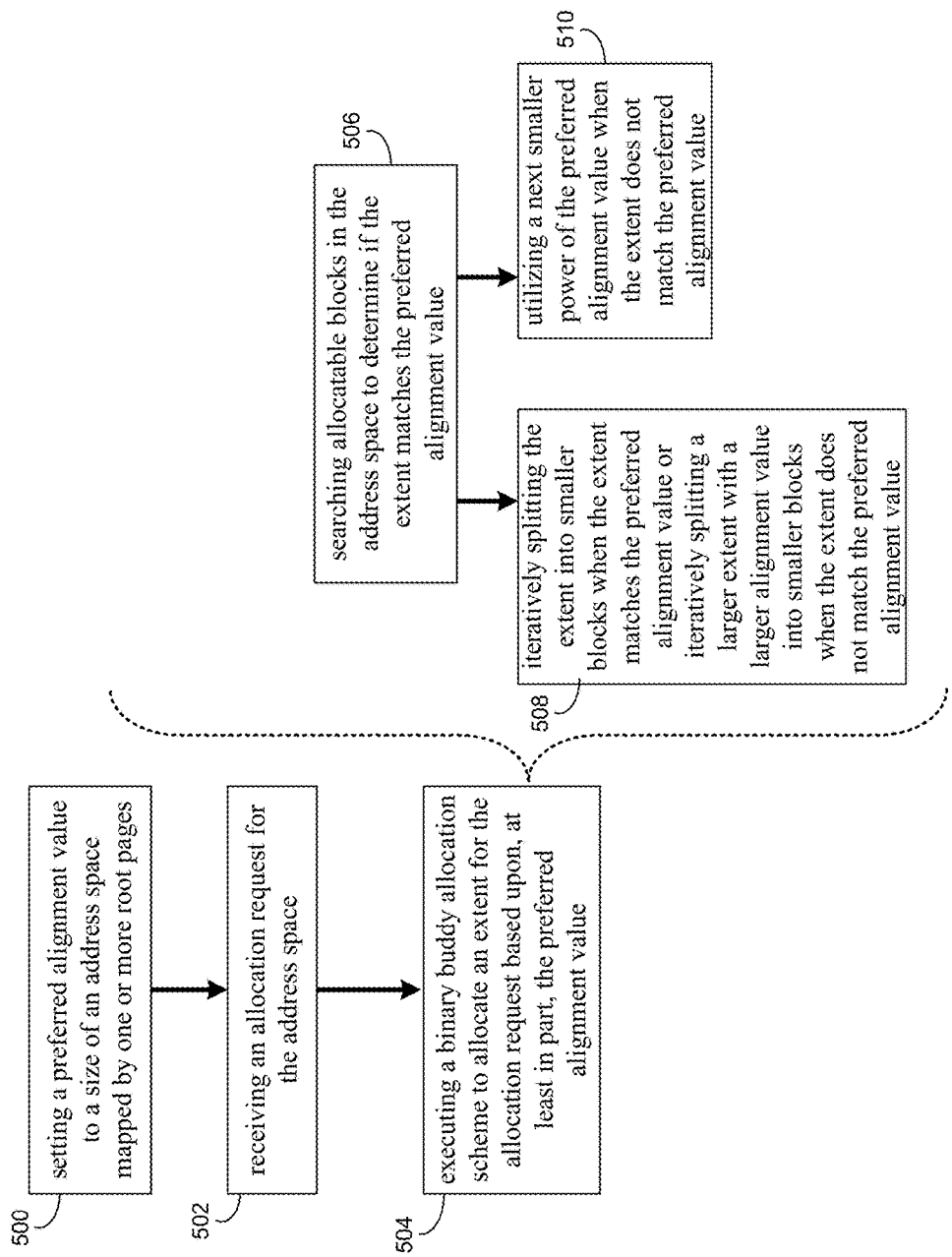
FIG. 5 is an example flowchart of an allocation process according to one or more example implementations of the disclosure.

The Allocation Process:

As discussed above and referring also at least to the example implementations of FIGS. 4-5, allocation process 10 may set 500 a preferred alignment value to a size of an address space mapped by one or more root pages. Allocation process 10 may receive 502 an allocation request for the address space. Allocation process 10 may execute 504 a binary buddy allocation scheme to allocate an extent for the allocation request based upon, at least in part, the preferred alignment value.

For example, in some general "binary buddy" schemes, the allocation logic (e.g., via allocation process 10) may start looking for a free extent of a desired size (e.g., to satisfy the received allocation request for the address space), and if one is found (regardless of alignment), it may be allocated for use. If no free extents are found that satisfy the received allocation request for the address space, the binary buddy allocator (e.g., allocation process 10) may attempt to allocate the next larger block size and split it into two of the smaller block sizes, one of which may be used to satisfy the allocation and the other may be marked as free. This search for an allocatable block may continue up progressively larger block sizes until (A) a block is found (in which case it may be repeatedly broken into smaller blocks until the desired block size is obtained), (B) no allocatable block is found, in which case allocation process 10 may fail the allocation request).

Unlike the general approach noted above, allocation process 10 may additionally take into account the concept of preferred allocation alignment to improve upon the standard binary buddy allocation scheme. For example, in some implementations, allocation process 10 may set 500 a preferred alignment value to a size of an address space mapped by one or more root pages, and in some implementations, allocation process 10 may receive 502 an allocation request for the address space. This may be set as a parameter in the logic (although other implementations may be possible). The current value may be chosen to be hard coded to the size of mapping that a root page maps (e.g., 256 TB) simply to initially spread objects across the address space on root boundaries. The value may be dependent on the desire to eliminate the root page as the synchronization bottleneck, and the underlying mapping (root/top/mid/leaf) each having 512 entries and the data block size produces, in the example for example purposes only, the 256 TB value (256 TB=512*512*521*512*4K (512 root/top/mid/leaf pointers pointing to a 4 KB data block). It will be appreciated that although this is a parameter that may be changed it may be effectively a constant based on the mapping layout. Thus, assume for example purposes only that the preferred alignment value is set at, e.g., 256 TB (e.g., the size of the address space a root maps, such as the root shown in FIG. 4). For example, in some implementations, allocation process 10 may execute 504 a binary buddy allocation scheme to allocate an extent for the allocation request based upon, at least in part, the preferred alignment value. That is, the preferred alignment value may be supplied to the binary buddy allocator (e.g., allocation process 10), which may then be used to locate an unused portion of the overall address space, which may then be used to satisfy the received allocation request.

In some implementations, executing the binary buddy allocation scheme may include searching 506 allocatable blocks in the address space to determine if the extent matches the preferred alignment value, and in some implementations, allocation process 10 may iteratively split 508 the extent into smaller blocks when the extent matches the preferred alignment value or may iteratively split 508 a larger extent with a larger alignment value may be iteratively split into smaller blocks when the extent does not match the preferred alignment value. For instance, the preferred alignment may be used to search up the larger allocatable blocks to determine if there are any extents that match the preferred alignment value. For example, assume for example purposes only that the system is trying to allocate a 1 TB extent with a preferred alignment of 256 TB. The binary buddy may be structured as a set of tiers of different power of 2 block sizes, where each tier is effectively a bitmap with bits set to indicate a block of that size is free. For this example, allocation process 10 may first look in the tier containing allocatable 256 TB blocks. If there are blocks of this size free, then allocation process 10 may grab one (it has the proper alignment) and allocate what is needed from it (e.g., freeing up smaller pieces if there are any that may be freed up). If a free block in the 256 TB tier is not found, allocation process 10 may then look in the 512 TB tier (e.g., if there is a block of that size available allocation process 10 may allocate it and then split it into 2 256 TB blocks, marking those 2 blocks as free in the 256 TB tier, where allocation process 10 may then got back to the step of allocating a block from the 256 TB tier, which may then succeed. If allocation process 10 does not find a free 512 TB block, allocation process 10 may go to the 1 PB tier, and try again, going to successively larger block sizes. If allocation process 10 does not find anything (meaning that nothing is available with the preferred alignment value) allocation process 10 may then divide the preferred alignment value in half and start looking in the tier with blocks of that size (in this example by starting to look in the 128 TB tier). This may continue to progressively smaller tier sizes until allocation process 10 either allocates a block for the extent needed or get to the point where the extent size is greater than the preferred alignment value, at which point the allocation fails as there are no blocks for the allocation request found.

In some implementations, each volume may be distributed to a different root indirect block page of the one or more root pages based upon, at least in part, the preferred alignment value being set to the size of the address space mapped by the one or more root pages. For example, allocation process 10 may distribute each volume in the storage system to a different root indirect block page when the preferred alignment is set at, e.g., 256 TB (e.g., the size of the address space a root maps).

In some implementations, a remainder of the address space associated with the extent may be freed. That is, as discussed above, since allocation process may also free the remainders of each extent that is not needed, those areas may be made available for allocation for additional volumes.

In some implementations, allocation process 10 may utilize 510 a next smaller power of the preferred alignment value when the extent does not match the preferred alignment value. For instance, as discussed above, the preferred alignment value may be honored if possible in the allocation code (e.g., of allocation process 10); however, if it is not possible to allocate an extent for the specific alignment value, allocation process 10 may attempt to honor the next smaller power of two for the alignment value. This process may repeat using smaller alignments until allocation process 10 either satisfies the request with an appropriate extent, or fails to allocate an appropriate extent.

In some implementations, additional volumes created in the address space may be spread uniformly through the one or more root pages. For example, allocation process may allow additional volumes created in the above-noted address space to be spread uniformly through the root pages mapping the address space. Advantageously, this may have a direct measureable performance impact when servicing I/O traffic against the volumes.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   setting a preferred alignment value to a size of an address space mapped by one or more root pages, wherein the address space includes one or more volumes, and wherein each volume of the one or more volumes is distributed to a different root indirect block page of the one or more root pages based upon, at least in part, the preferred alignment value being set to the size of the address space mapped by the one or more root pages;
   receiving an allocation request for the address space; and
   executing a binary buddy allocation scheme to allocate an extent for the allocation request based upon, at least in part, the preferred alignment value, wherein executing the binary buddy allocation scheme includes
   searching allocatable blocks in the address space to determine if the extent matches the preferred alignment value.

2. The computer-implemented method of claim 1 wherein a remainder of the address space associated with the extent is freed.

3. The computer-implemented method of claim 1 further comprising one of iteratively splitting the extent into smaller blocks when the extent matches the preferred alignment value and iteratively splitting a larger extent with a larger alignment value into smaller blocks when the extent does not match the preferred alignment value.

4. The computer-implemented method of claim 1 further comprising utilizing a next smaller power of the preferred alignment value when the extent does not match the preferred alignment value.

5. The computer-implemented method of claim 1 further comprising adding additional volumes to the one or more volumes, wherein the additional volumes created in the address space are spread uniformly through the one or more root pages.

6. A computer program product residing on a non-transitory computer readable storage medium having a plurality of instructions stored thereon which, when executed across one or more processors, causes at least a portion of the one or more processors to perform operations comprising:
   setting a preferred alignment value to a size of an address space mapped by one or more root pages, wherein the address space includes one or more volumes, and wherein each volume of the one or more volumes is distributed to a different root indirect block page of the one or more root pages based upon, at least in part, the preferred alignment value being set to the size of the address space mapped by the one or more root pages;
   receiving an allocation request for the address space; and
   executing a binary buddy allocation scheme to allocate an extent for the allocation request based upon, at least in part, the preferred alignment value, wherein executing the binary buddy allocation scheme includes
   searching allocatable blocks in the address space to determine if the extent matches the preferred alignment value.

7. The computer program product of claim 6 wherein a remainder of the address space associated with the extent is freed.

8. The computer program product of claim 6 wherein the operations further comprise one of iteratively splitting the extent into smaller blocks when the extent matches the preferred alignment value and iteratively splitting a larger extent with a larger alignment value into smaller blocks when the extent does not match the preferred alignment value.

9. The computer program product of claim 6 wherein the operations further comprise utilizing a next smaller power of the preferred alignment value when the extent does not match the preferred alignment value.

10. The computer program product of claim 6 further comprising adding additional volumes to the one or more volumes, wherein the additional volumes created in the address space are spread uniformly through the one or more root pages.

11. A computing system including one or more processors and one or more memories configured to perform operations comprising:

setting a preferred alignment value to a size of an address space mapped by one or more root pages, wherein the address space includes one or more volumes, and wherein each volume of the one or more volumes is distributed to a different root indirect block page of the one or more root pages based upon, at least in part, the preferred alignment value being set to the size of the address space mapped by the one or more root pages;

receiving an allocation request for the address space; and executing a binary buddy allocation scheme to allocate an extent for the allocation request based upon, at least in part, the preferred alignment value, wherein executing the binary buddy allocation scheme includes searching allocatable blocks in the address space to determine if the extent matches the preferred alignment value.

12. The computing system of claim 11 wherein a remainder of the address space associated with the extent is freed.

13. The computing system of claim 11 wherein the operations further comprise one of iteratively splitting the extent into smaller blocks when the extent matches the preferred alignment value and iteratively splitting a larger extent with a larger alignment value into smaller blocks when the extent does not match the preferred alignment value.

14. The computing system of claim 11 wherein the operations further comprise utilizing a next smaller power of the preferred alignment value when the extent does not match the preferred alignment value.

15. The computing system of claim 11 wherein the operations further comprise adding additional volumes to the one or more volumes, wherein the additional volumes created in the address space are spread uniformly through the one or more root pages.

* * * * *